United States Patent [19]
Makinster et al.

[11] 3,750,591
[45] Aug. 7, 1973

[54] DRIVE MEANS FOR CABLE-MOUNTED VEHICLE
[76] Inventors: Marshall C. Makinster, Box 177, Grand Ronde, Oreg. 97347; Wayne P. Grippin, Box 418, Willamina, Oreg. 97396
[22] Filed: Sept. 30, 1971
[21] Appl. No.: 185,264

[52] U.S. Cl..................... 104/112, 104/178, 212/94
[51] Int. Cl............................................. B61b 7/02
[58] Field of Search..................... 104/112, 165, 178, 104/180; 212/83, 84, 89, 94, 97, 98; 191/12.2 A

[56] References Cited
UNITED STATES PATENTS

| | | | |
|---|---|---|---|
| 2,953,101 | 9/1960 | Sommer | 104/178 |
| 1,425,827 | 8/1922 | Barton | 104/112 |
| 1,276,443 | 8/1918 | Tanzer | 104/112 |
| 2,654,547 | 10/1953 | Ball et al. | 191/12.2 A |
| 2,781,456 | 2/1957 | Buckeridge | 191/12.2 A |

Primary Examiner—Drayton E. Hoffman
Attorney—Kolisch & Hartwell

[57] ABSTRACT

Drive means for a cable-supported carriage in a cable-logging system. The drive means include an elongated stationary line that extends along and adjacent the cable which supports the carriage, a plurality of sheaves mounted on the carriage which frictionally engage the line, and a reversible hydraulic motor also mounted on the carriage for driving the sheaves.

6 Claims, 3 Drawing Figures

PATENTED AUG 7 1973
3,750,591
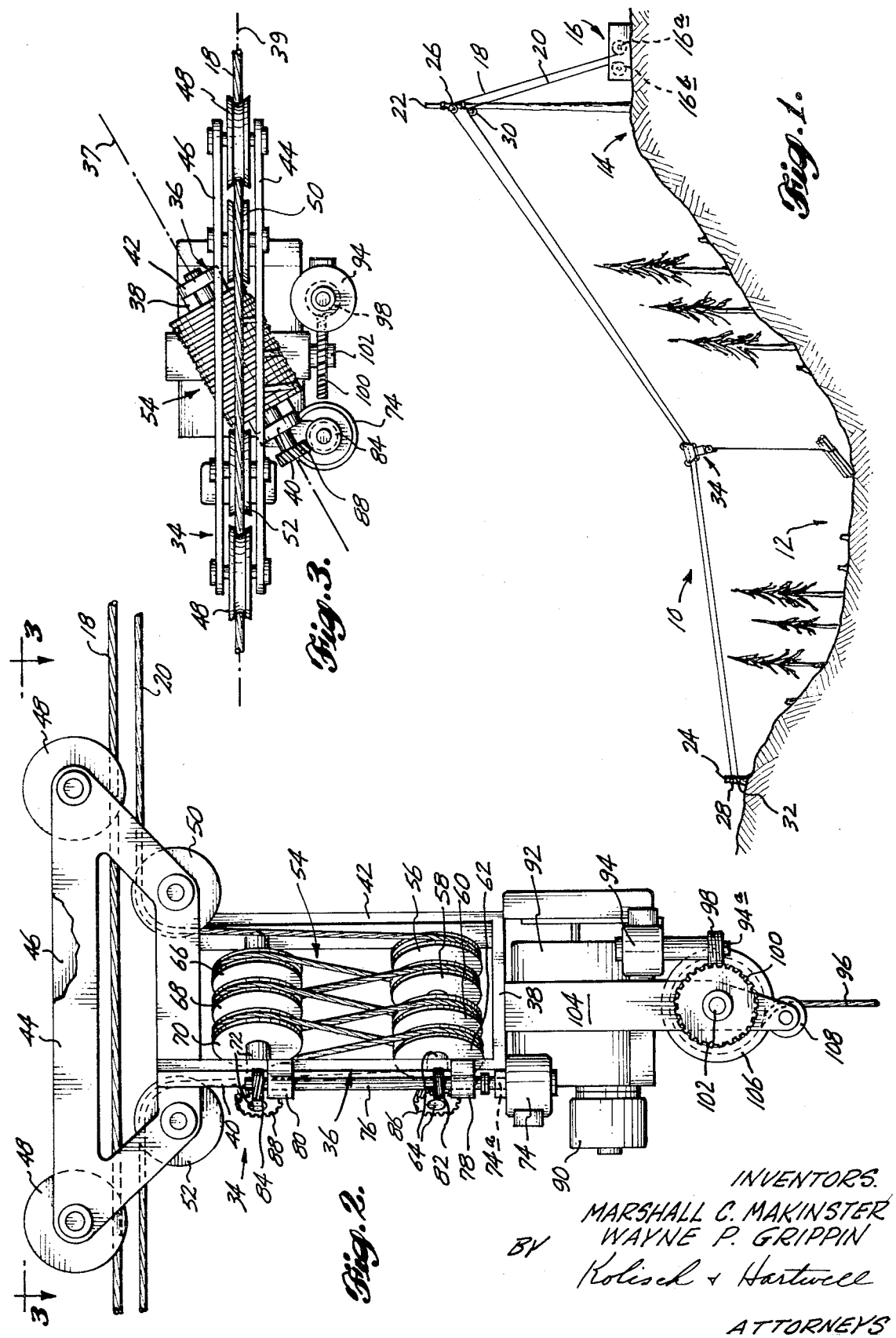
INVENTORS.
MARSHALL C. MAKINSTER
WAYNE P. GRIPPIN
BY Kolisch + Hartwell
ATTORNEYS

DRIVE MEANS FOR CABLE-MOUNTED VEHICLE

BACKGROUND AND SUMMARY OF THE INVENTION

This invention pertains to a means for driving a cable-mounted vehicle, such as a carriage. For the purpose of illustration herein, a preferred embodiment of the invention is described in connection with a cable-logging system wherein the invention has been found to have particular utility.

In a typical cable-logging system, a carriage is mounted on an aerial cable called a "skyline" for movement back and forth over a path in the woods. Attached to the carriage, normally, are one or more winch-operated traveling cables which are for driving the carriage back and forth along the skyline. Typically, these traveling cables are taken up and paid out by winches located on the ground adjacent one end of the system. Extending down from the carriage is what is known as a "snubbing" line that is adapted to be secured to a load of one or more logs which are to be hauled. The snubbing line normally is taken up and paid out (lowered) by a winch or other suitable means mounted on the carriage.

In a typical operation in such a system, through manipulation of the one or more traveling drive cables attached to the carriage, the carriage is moved to a position over where a load of logs below the skyline is to be picked up. The snubbing line is lowered, is attached suitably to the charge, and then is taken up to lift one end of the charge above the ground. With the charge of logs so lifted, the snubbing line is suitably secured, and the drive cable, or cables, for the carriage are again manipulated—this time to haul the load of logs (with one end thereof dragging on the ground) to the place along the system where it is to be deposited. The snubbing line is then lowered and the charge released. The carriage may then be returned along the skyline to wherever it is next needed to pick up a load of logs.

It will be appreciated that a system of the type just described ordinarily is installed in relatively rough terrain. Further, it will be appreciated that an installation of such a system may well be temporary—the system being needed in a particular region only so long as logging is under way there. Among the drawbacks in the past in a system of the type outlined has been that the use of one or more traveling drive cables for driving a carriage makes installation and maintenance of the system somewhat inconvenient and costly. The presence of such traveling drive cables obviously introduces a number of potential maintenance problems; and the fact that a system typically is located in rough terrain makes maintenance, if such is needed, especially difficult. In addition, the considerable time usually required properly to rig traveling drive cables for a carriage can become quite costly over time as a system is moved from place to place.

A general object of the present invention, therefore, is to provide a novel drive means for a carriage, or like vehicle, in a system of the type generally described which avoids the drawbacks mentioned in a practical and satisfactory manner.

More specifically, an object of the invention is to provide such a drive means which eliminates the need for a traveling drive cable for such a carriage.

According to a preferred embodiment of the invention, the proposed drive means features an elongated stationary cable, or line, which extends along and adjacent the usual skyline provided in a system of the type described. Mounted on the carriage (which is supported for travel along the skyline), are a plurality of sheaves over which this stationary line is reeved. The sheaves frictionally engage the line for rolling contact therealong. Also mounted on the carriage is a reversible hydraulic motor which is drivingly connected to the sheaves. The motor is powered in any suitable manner, as by a hydraulic pump, and a gasoline engine drivingly connected thereto also mounted on the carriage.

With such an organization, to move the carriage along the skyline in one direction, the hydraulic motor is operated in one direction to drive the sheaves, with a thrust in one direction thus being produced on the carriage which moves it in one direction along the skyline. The direction of carriage travel may be reversed simply by reversing the direction of the hydraulic motor. Braking or slowing down of the carriage is accomplished readily by slowing down this motor. The direction and speed of operation of the motor preferably are controlled remotely (i.e., from some point on the ground), in any suitable manner, as by a radio control system.

Installation of such a drive means in a cable-logging system is obviously much simpler than installation of traveling drive cables of the type used heretofore. In addition, the absence of such traveling cables obviously greatly minimizes potential maintenance problems.

DESCRIPTION OF THE DRAWINGS

These and other objects and advantages attained by the invention will become more fully apparent as the description which follows is read in conjunction with the accompanying drawings, wherein:

FIG. 1 is a simplified and fragmentary side elevation illustrating a cable-logging system embodying the present invention, and installed for an uphill logging operation;

FIG. 2 is an enlarged fragmentary side elevation illustrating details of a carriage in the system of FIG. 1, and also illustrating details of a drive means provided therefor according to the invention; and FIG. 3 is a view taken generally along the line 3—3 in FIG. 2.

DETAILED DESCRIPTION OF THE INVENTION

Turning now to the drawings, and referring first to FIG. 1, indicated generally at 10 is an aerial cable-logging system which incorporates the present invention. System 10 has been installed in the woods to handle what might be thought of as an uphill logging operation, where fresh logs that have been cut in the valley, indicated generally at 12, are to be picked up and hauled to the top of a hill, indicated generally at 14, for transfer to trucks or other equipment for removing them from the woods.

Suitably positioned adjacent the top of hill 14, and included in system 10, is a power-operated winch mechanism 16 including a pair of engine-driven drums shown in dashed outline at 16a, 16b. Wound on drums 16a, 16b are the inner ends of elongated cables 18, 20, respectively. These cables are preferably formed from steel, with cable 18 somewhat larger in diameter than cable 20. The diameter difference between the cables (the purpose for which will be more fully explained later) is best illustrated in FIG. 2.

Cables 18, 20 are supported adjacent opposite ends of the system on a so-called "tower" and "tail-hold" indicated at 22, 24, respectively. The tower and tail-hold herein comprise the lower parts of the trunks of trees which have been topped. Generally speaking, cable 18 is disposed slightly above cable 20 in the system. Progressing from drum 16a, cable 18 extends over a sheave 26 mounted on tower 22, and from this sheave extends in a reach down the hill and across the valley to tail-hold 24. The left end of cable 18 in FIG. 1 is suitably anchored at 28 on the tail-hold. Cable, or line, 20 is incorporated in system 10 in accordance with the present invention. Progressing from drum 16b, cable 20 extends over a sheave 30 which is mounted on tower 22 slightly below sheave 26. From sheave 30, cable 20 extends in a reach down the hill and across the valley to tail-hold 24, where its left end in FIG. 1 is anchored at 32.

Under normal operating conditions in system 10, and once cables 18, 20 have been properly rigged in the system, these cables remain stationary. In other words, they do not travel in the system, and are neither taken up nor paid out by drums 16a, 16b. The fact that their inner ends are wound on these drums is a feature which enables vertical adjustment of the positions of the cables (particularly during rigging of the system) to accommodate the system to the particular terrain where it is being employed.

Mounted for travel back and forth on skyline 18 is a carriage, or vehicle, 34. Referring particularly to FIGS. 2 and 3, carriage 34 comprises a somewhat U-shaped frame 36 including an elongated base member 38, and a pair of spaced-apart uprights 40, 42 joined to opposite ends of the base member. Frame 36, when viewed from above as in FIG. 3, occupies a plane 37 disposed at the angle shown relative to the generally upright plane 39 containing cable 18. The upper ends of uprights 40, 42 are joined as by welding to spaced-apart substantially parallel pulley support members 44, 46, respectively. The pulley support members have matching side outlines, such as that illustrated in FIG. 2.

Journaled on and between the upper opposite ends of the pulley support members are pulleys 48 which ride (roll) on cable 18. Journaled on and between members 44, 46 beneath pulleys 48 are pulleys 50, 52 whose functions will be more fully explained shortly.

Mounted on frame 36 between uprights 40, 42 is a sheave assembly, or means, 54 constructed as contemplated herein. The sheave assembly comprises a lower set of four sheaves, including sheaves 56, 58, 60, 62, anchored on a shaft 64 which is suitably journaled (adjacent its opposite ends) on the frame uprights. The sheave assembly also comprises an upper set of three sheaves, including sheaves 66, 68, 70, which are anchored on a shaft 72 that is journaled (adjacent its opposite ends) on the frame uprights. The left ends of shafts 62, 72 extend through, and to the left of, upright 40 in FIGS. 2 and 3.

As can be seen particularly in FIG. 2, progressing along cable 20 from the right side of the figure, the cable extends, or is reeved, as shown in succession about pulley 50, sheaves 56, 66, 58, 68, 60, 70, 62, and pulley 52. And it should be noted that because of the angular position of frame 36 (and hence of the shafts carrying the sheaves in assembly 54), the portions of cable 20 that extend between pulley 50 and sheave 56 and between pulley 52 and sheave 62 are substantially vertical, and in plane 39. This arrangement minimizes lateral (axial) pull on pulleys 50, 52, which function to guide cable 20 into and out of the sheave assembly. It will be obvious that the various sheaves in assembly 54, and pulleys 50, 52, frictionally engage cable 20 and are disposed for rolling contact with the cable.

The particular sheave arrangement shown herein is preferred since it results in a compact organization that performs well. Other arrangements are, of course, possible, with a larger or a smaller number of sheaves employed, and/or with a different relative positioning of shafts supporting the sheaves.

According to the present invention, a motor, or motor means, is provided for driving the sheaves in assembly 54. Such a motor is indicated at 74, and preferably comprises a reversible hydraulic motor. Motor 74 is suitably anchored adjacent the lower end of frame upright 40, and the output shaft 74a of the motor is drivingly connected through a coupling 75 to an axially aligned shaft 76 which is journaled in bearings 78, 80 that are suitably mounted on the left side of upright 40 in FIGS. 2 and 3. Suitably anchored on shaft 76 for rotation therewith are worm gears 82, 84 which are mounted on the shaft immediately above bearings 78, 80, respectively. The threads on gears 82, 84 have pitches which are substantially the same in magnitude, but the reverse in direction. Gears 82, 84 mesh with worm wheels 86, 88, respectively, which are anchored to the left ends of shafts 64, 72, respectively, in FIG. 2.

With operation of motor 74 in one direction, shafts 64, 72, and the respective set of sheaves anchored on the shafts, rotate in one set of reverse directions; and with operation of the motor in the opposite direction, the shafts and their supported sheaves rotate in another set of reverse directions. More specifically, with operation of motor 74 in a direction which turns shaft 76 clockwise as such is viewed axially from its upper end in FIG. 3, shaft 64, and the sheaves mounted on it, turn as a unit in a counterclockwise direction as viewed axially from the left end of shaft 64 in FIG. 2, and shaft 72 and the sheaves mounted on it turn clockwise when so viewed. As a consequence, the sheave assembly pulls in on that part of cable 20 which extends to the left of the carriage in the figures, and produces a thrust on the carriage which moves it to the left along skyline 18. With the motor reversed, the reverse operations take place.

Fluid under pressure for operating motor 74 is supplied by a hydraulic pump 90 which is suitably mounted on and driven by a gasoline engine 92 that is suitably anchored to the underside of frame 36. Suitable remotely controllable valving mechanism (concealed) is provided for controlling the flow of hydraulic fluid between pump 90 and motor 74.

Pump 90 also supplies hydraulic fluid under pressure to a reversible hydraulic motor 94 which is for adjusting the position of a conventional "snubbing" line 96 which hangs down from carriage 34. Motor 94 is suitably mounted on the carriage, and includes an output shaft 94a which carries a worm gear 98 that meshes with a worm wheel 100. Worm wheel 100 is anchored to a shaft 102 which is journaled on a pair of elongated brackets, such as bracket 104, which are joined to and extend downwardly from base member 38 in frame 36. Mounted on shaft 102 for rotation therewith, and disposed between brackets 104, is a winch drum 106 on which the upper end of line 96 is wound. From drum 106 line 108 extends over a guide pulley 108 which is also journaled on brackets 104. As in the case of controlling the operation of motor 74, suitable remotely controllable valving mechanism (concealed) is provided for controlling the flow of hydraulic fluid between pump 90 and motor 94.

Explaining now how the apparatus described herein performs, when it is desired to shift the carriage in a particular direction along the skyline, motor 74 is operated in the suitable direction. More specifically, if it is desired to shift the carriage to the right along the skyline in the figures, motor 74 is operated in a direction which produces counterclockwise rotation of shaft 76 as such is viewed axially from its upper end. With the motor so operated, and because of frictional engagement between the sheaves in assembly 54 and line 20, the sheaves pull in on that portion of cable 20 which extends to the right of the carriage in the figures, with the result that the carriage as a whole moves to the right along the skyline. To move the carriage to the left along the skyline, motor 74 is simply operated in the reverse direction.

It will be noted that throughout this kind of operation, cable 20 remains stationary in the sense that its opposite ends remain anchored in place. The carriage is thus propelled along the skyline through the action of a motor and sheave mechanism carried on it, with driving force developed through frictional engagement between the sheaves and cable 20.

Cable 20, which must be reeved about the sheaves in assembly 54, must obviously be relatively flexible. It need only be large enough (in diameter) adequately to carry the expected driving forces which will be required to move the carriage. Cable 20, thus, is preferably as small in diameter as possible. Skyline cable 18, however, must be stout enough to support the full weight of carriage 34 and the equipment that such carries, together with the full weight of a load of logs. Thus, its diameter must be larger than that of cable 20.

As mentioned briefly earlier, the operations of motors 74, 94 are controllable remotely (i.e., from some point on the ground). Such control may be accomplished, for example, through conventional radio control apparatus. Speeding up and slowing down of the carriage is readily accomplished through controlling the operating speed of motor 74. The fact that motor 74 is hydraulic is a feature which aids in such speed control.

Thus, the invention provides a novel drive means for a cable-mounted vehicle, such as the carriage described herein. Traveling drive cables and their drawbacks are avoided. Instead, there is employed a novel stationary cable which is frictionally engaged by power-driven sheaves carried on a vehicle that is to be driven.

While a preferred embodiment of the invention has been described herein, it is appreciated that variations and modifications may be made therein without departing from its spirit.

It is claimed and desired to secure by Letters Patent:

1. In combination with a carriage and an elongated cable reach which supports the carriage with the carriage movable along said cable reach, means for propelling the carriage along said cable reach comprising motor means mounted on said carriage,
sheave means also mounted on said carriage, said sheave means including at least one sheave rotatably mounted on said carriage drivingly connected to and adapted to be rotated under power by said motor means, and
an elongated stationary line reach extending along and adjacent said cable reach, said line reach including a bend portion adjacent said carriage curving over a portion of and frictionally engaging said one sheave, powered rotation of said sheave by said motor means causing said sheave to advance along said line reach to propel the carriage on the cable reach.

2. The drive means of claim 1, wherein said motor means comprises a reversible hydraulic motor.

3. In combination with a carriage and an elongated cable reach which supports the carriage with the carriage movable along said cable reach,
adjustable means on the carriage for holding a load, and means for propelling the carriage together with such load along said carriage reach, the latter means comprising
an elongated stationary line reach extending along and adjacent said cable reach,
a sheave rotatably mounted on said carriage frictionally engaging a bend of said line reach, and disposed for rolling contact along said line reach with rotation of the sheave, and
motor means also mounted on said carriage, drivingly connected to said sheave and operable to rotate the same under power, powered rotation of said sheave by said motor means causing said sheave to advance along said line reach to propel the carriage.

4. The drive means of claim 3, wherein said motor means comprises a reversible hydraulic motor.

5. The combination of claim 3, wherein said adjustable means on the carriage for holding a load includes a rotatable drum, and said motor means also is drivingly connected to said drum.

6. In a cable-logging system, the combination of an elongated aerial cable and a carriage mounted for travel back and forth along said cable,
powered adjustable means on the carriage for holding a load, and
means for propelling the carriage together with such load along said cable, the latter means comprising
an elongated stationary line extending along and adjacent said cable,
a sheave assembly including a plurality of sheaves rotatably mounted on said carriage said stationary line extending in bends over said sheaves and the sheaves being disposed for rolling contact along said stationary line with rotation of the sheaves, said line passing into and out of said assembly of sheaves at regions disposed below the cable which regions together with the cable occupy substantially a vertical plane, and
a reversible hydraulic motor also mounted on said carriage drivingly connected to said sheaves and operable to rotate the same under power.

* * * * *